United States Patent
Robert et al.

(10) Patent No.: US 7,502,413 B2
(45) Date of Patent: Mar. 10, 2009

(54) MOTION ESTIMATOR FOR CODING AND DECODING IMAGE SEQUENCES

(75) Inventors: Guillaume Robert, Kembs (FR); Nathalie Laurent-Chatenet, Vignoc (FR)

(73) Assignee: France Telecom, Paris (FR)

( * ) Notice: Subject to any disclaimer, the term of this patent is extended or adjusted under 35 U.S.C. 154(b) by 685 days.

(21) Appl. No.: 10/332,684

(22) PCT Filed: Jul. 3, 2001

(86) PCT No.: PCT/FR01/02131

§ 371 (c)(1), (2), (4) Date: Sep. 15, 2003

(87) PCT Pub. No.: WO02/07099

PCT Pub. Date: Jan. 24, 2002

(65) Prior Publication Data

US 2004/0047415 A1    Mar. 11, 2004

(30) Foreign Application Priority Data

Jul. 13, 2000    (FR) ................................. 00 09273

(51) Int. Cl.
*H04N 7/12* (2006.01)
*G06K 9/36* (2006.01)

(52) U.S. Cl. ........................... 375/240.01; 375/240.09; 382/232

(58) Field of Classification Search ................ 348/416, 348/413, 699, 402, 415, 409, 401, 400, 390, 348/384, 394, 395, 403, 404, 407, 408, 410, 348/411, 412, 414; 382/236, 241, 243, 238, 382/232, 240, 248; 375/240.12, 240.01, 375/240.09, 240.16, 240.03

See application file for complete search history.

(56) References Cited

U.S. PATENT DOCUMENTS

| | | | | |
|---|---|---|---|---|
| 5,654,771 A | * | 8/1997 | Tekalp et al. | 348/699 |
| 5,936,671 A | * | 8/1999 | Van Beek et al. | 348/413 |
| 5,963,209 A | * | 10/1999 | Hoppe | 345/419 |
| 6,064,771 A | * | 5/2000 | Migdal et al. | 382/232 |
| 6,438,266 B1 | * | 8/2002 | Bajaj et al. | 382/243 |
| 6,614,428 B1 | * | 9/2003 | Lengyel | 345/420 |
| 7,139,314 B2 | * | 11/2006 | Nakaya et al. | 375/240.16 |
| 2004/0037471 A1 | * | 2/2004 | Laurent-Chatenet et al. | 382/236 |

OTHER PUBLICATIONS

Chung-Lin Huang, A new Motion Compensation Method for image sequence coding using Hierarchical Grid interpolation, 4, pp. 42-51.*

"Very Low Bit Rate Video Coding Using Active Triangular Mesh", by P. Salembier et al., Dept. of Signal Theory and Communications, May 7, 1996, pp. 2060-2063.

"Two-Dimensional Mesh-Based Visual-Object Representation for Interactive Synthetic/Natural Digital Video", by A. Murat Tekalp et al., Proceedings of the IEEE, US, IEEE, New York, vol. 86, No. 6, Jun. 1998, pp. 1029-1051.

* cited by examiner

*Primary Examiner*—Behrooz Senfi
(74) *Attorney, Agent, or Firm*—Westman, Champlin & Kelly, P.A.

(57) ABSTRACT

The invention relates to motion estimation and compensation between two given images represented by a polygonal mesh. It provides a solution to the problems of crowding and uncovering of mesh units when the mesh is shifted. More specifically, the invention relates to a method for the encoding of a mesh that represents an image of a moving sequence. According to the invention, such a mesh is larger in size than the image.

22 Claims, 12 Drawing Sheets

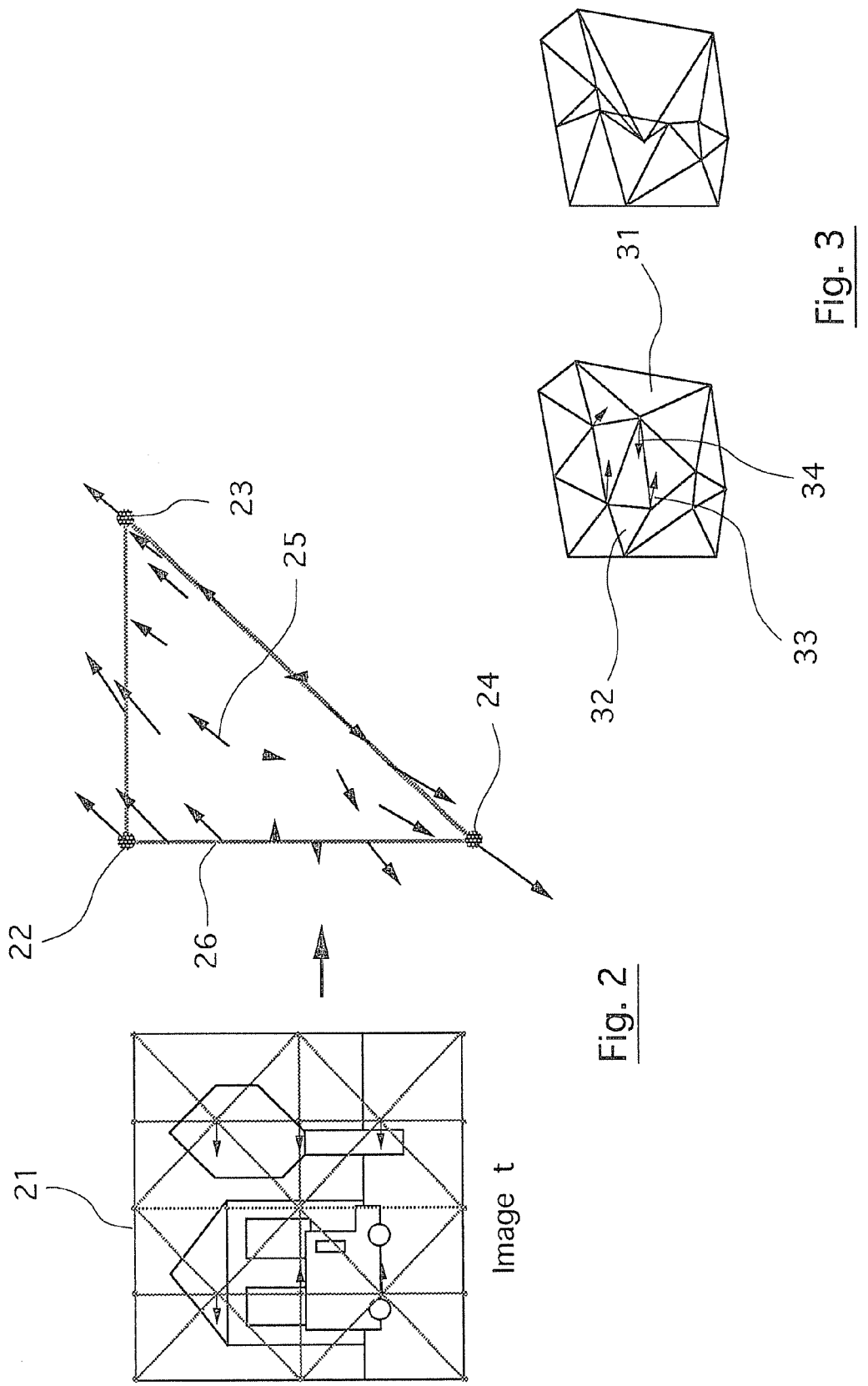

MOTION ESTIMATOR FOR CODING AND DECODING IMAGE SEQUENCES

CROSS-REFERENCE TO RELATED APPLICATION

This application is the US national phase of international application, 371 of PCT/FR01/02131, filed 3 Jul. 2001 which claim benefit of FR00/09273, filed 13 Jul. 2000.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

FIELD OF THE INVENTION

The field of the invention is that of the encoding of images or image sequences. More specifically, the invention relates to motion estimation and compensation between two given images.

BACKGROUND OF THE INVENTION

The concept of motion between two images of a sequence is well known in the scientific and technological community working on image processing. It is defined as the 2D vector characterizing the difference of positions between a pixel of one image and the homologous pixel in the other image, it being assumed that these pixels correspond to the same physical point in each of the two images. The assignment of a shift vector to each pixel in the image therefore defines a dense motion field in the image, as shown in FIG. 1. The set 10 of the N*M vectors obtained for a size N*M image is called the field of motion, or optical stream, between two images 11 and 12 respectively corresponding to the instants t and t+1.

The estimation of the motion between two images (the computation of the field of shift or of disparities between two images) can be applied in all kinds of imaging and image processing. The following can be mentioned as non-restrictive examples:

video encoding: the motion field is used to predict an image from previously decoded images. The mesh representation of such a field is defined especially in different standards such as the MPEG-4 standard.

medical imaging: the analysis of the motion of the human body, the heart, etc.

the tracking of objects (for example in road traffic control).

The invention can be applied especially to the processing of 2D images, but also to the processing of images representing multidimensional objects (especially 3D objects).

At present, there are several techniques for estimating motion in image sequences.

In a first technique, a dense field of motion is computed for the image, and a shift vector is applied to each pixel.

A second technique is aimed at computing one shift vector per rectangular block of the image.

A third technique is based on the computation of a mathematical model of the motion by region, possibly in arbitrary form, of the image. Such a technique therefore also implements a segmentation of the image into regions, corresponding for example to the different video objects constituting the illustrated scene.

A last technique, described for example in the patent application FR 2 783 123 entitled "Procédé d'estimation du mouvement entre deux images" (Method for the estimation of motion between two images), consists in computing a field defined by a model of finite elements. A mesh is associated with the image, and an interpolation or extrapolation function is used to compute the value of the field at each pixel of the image, within each of the mesh points, as shown in FIG. 2.

This method, as it happens, is based on the implementation of a differential method, which determines the motion parameters by optimization of a mathematical criterion of quality (for example a quadratic error between the image and its predicted value by compensation for the motion). Such an optimization is achieved by means of a method of differential mathematical optimization, in the case of criteria possessing the necessary mathematical properties (for example, a derivable criterion).

Thus, for example, a triangular mesh is associated with the image 21. The value of the motion vectors of the vertices referenced 22, 23 and 24 of the mesh is optimized. Then an interpolation (or an extrapolation) is made in order to determine the motion vectors of the pixels that do not correspond to vertices of the mesh, such as the points referenced 25 and 26 for example.

A motion estimation method of this kind, relying on the implementation of a hierarchical mesh representing the image to be encoded, is especially suited to the gradual transmission of the data, and therefore represents an advantageous solution to the problems of bandwidth saturation and of adaptability to communications networks of various kinds and capacities.

However, such a method comes up again certain difficulties during motion tracking.

Thus, one drawback of this prior art technique is that it gives rise to the shifting of the mesh points, leading to either crowding or uncovering in certain regions of the image, as shown in FIG. 5. Indeed, the deformable meshes define a continuous representation of a motion field (that is, the mesh follows the objects moving in the scene), while the real motion of a video sequence is discontinuous in nature. Consequently, when an object shifts for example from left to right in the image 51, the left-hand region 52, uncovered by the shifting of the object, represents a new piece of information, and is therefore no longer meshed. The right-hand region 53 for its part takes a crowding of mesh points. Similarly, when different planes and objects overlap in a scene, regions of concealment appear, generating lines of discontinuity.

Now, apart from the information on motion, the vertices of the mesh are also carriers of photometric and/or colorimetric information used to generate a photometric and/or colorimetric field, and therefore to achieve an approximation of the image. The appearance of non-meshed uncovering regions therefore corresponds to the entry, into the image, of regions whose photometry and/or colorimetry cannot be approximated; in other words, these are black regions.

The solutions generally proposed to compensate for the appearance of non-meshed uncovering regions, or crowding regions, characterized by a redundancy of information, consist in forcing the nodes of the edge of the image (for example the node referenced 511) to remain still.

One drawback of this prior art technique is that the approximation of the entering regions is of mediocre quality, owing to the stretching of the associated mesh points.

Another drawback of this prior art technique is that the motion estimation is biased by the constraint of mobility imposed on the nodes of the edges of the image.

This prior art technique also has the drawback of giving rise to an excessively costly over-approximation of the regions going out of the image, corresponding to the mesh point crowding regions. Indeed, in the crowding regions, an over-representation of the motion field is obtained. This is because an excessively great number of mesh points is used to obtain the approximation of a limited portion of the motion field. Such an over-representation does not harm the quality of approximation of the motion field, but gives rise to extra transmission costs.

In another solution envisaged to compensate for the appearance of uncovering regions or crowded regions of the mesh, new pixels are inserted in the black regions and a constrained Delaunay mesh is constructed.

One drawback of this prior art technique is that it is costly in terms of transmission bit rate and/or of information storage.

Another problem related to the disturbances of the motion field is the appearance of reversal of the mesh points of the hierarchical mesh representing the image, as shown in FIG. 3, when certain mesh points 31, 32 shift with respect to one another along antagonistic motion vectors 33, 34.

Several methods have been envisaged to overcome such mesh point reversals.

Placing constraints on the different mesh points has been considered, so as to prohibit the reversal phenomena.

The performance of a post-processing operation on the mesh has also been considered. This could be done into distinct modes. In a first embodiment of a post-processing operation, the motion vectors as estimated are applied to the different nodes of the mesh. Then the motion vectors that have led to the appearance of defects in the mesh are detected, and finally their value is corrected, so as to compensate for the mesh reversal phenomena.

A second embodiment of a post-processing operation consists of an iterative method: at each iteration, a part of the estimated shift is applied to each of the nodes of the mesh, so as not to generate any mesh point reversal. The iterations are then repeated until a convergence of the method is obtained.

However, since the post-processing methods act after the motion vectors of the different nodes of the mesh had been estimated, they do not provide for optimum management of the mesh point reversals. Indeed, in the post-processing methods, the motion vectors are corrected independently of their contribution to the minimizing of the prediction error (for example the minimizing of the quadratic error between the image and its predicted value by motion compensation).

The technique described in the French patent application FR 99 15568, "Procédé d'estimation de mouvement entre deux images avec gestion de retournements de mailles et procédé de décodage correspondant" (Method for the estimation of motion between two images with management of mesh point reversal and corresponding method of decoding) proposes a solution to the problem of reversal generated by the motion estimator. This solution relies on the implementation of a hierarchical mesh.

Such a technique consists in carrying out an initial optimization of the motion vectors of the mesh, in letting the motion estimator create reversals if any between two successive instants $t_1$ and $t_2$, so as to detect the regions of discontinuity thus generated. The method then consists in making a further motion estimation between the instants $t_1$ and $t_2$, in excluding the defective regions (namely the regions containing at least one mesh point reversal), in order to minimize the prediction error between the two images corresponding to the instants $t_1$ and $t_2$ considered.

This new estimation is used to determine the optimal motion vectors for the continual region of the image (that is, assuming a bijection between $t_1$ and $t_2$) and thus prevent the values of the motion vectors obtained during the initial optimization from being disturbed by the existence of regions of discontinuity. The defective regions are then approximated by a frequency method or spatial method, when the method is applied to image compression for example, and these regions are definitively excluded from the optimization method, when the technique is applied to the tracking of video objects for example.

One drawback of this prior art technique is that it cannot be used to manage the appearance of mesh point uncovering regions or mesh point crowding regions during a translation of an object within the image, as described here above.

It is a goal of the invention in particular to overcome these drawbacks of the prior art.

More specifically, it is a goal of the invention to provide a technique for the encoding of images represented by means of a mesh, enabling an estimation of and a compensation for the motion within the image.

It is another goal of the invention to implement an image encoding technique by which it is possible to obtain a good approximation of the photometric and/or colorimetric surface of the image, especially for the highly textured zones.

It is yet another goal of the invention to provide a simple and robust technique for the encoding of images.

It is also a goal of the invention to implement an image encoding technique adapted to all the fields in which the motion is estimated by means of meshes, and especially to the field of video encoding (such as video encoding according to the MPEG4 and H263+ standards for example).

It is another goal of the invention to provide an image encoding technique with reduced cost of information transmission.

It is yet another goal of the invention to implement an image encoding technique providing for the visual fluidity of the shifting of the image.

It is yet another goal of the invention to provide an image encoding technique enabling the efficient management of the appearance of uncovering zones and/or crowding zones during the shifting of the constituent objects of the image.

It is also a goal of the invention to implement an image encoding technique making it possible to manage the phenomena of reversal and concealment of mesh points.

It is another goal of the invention to provide an image encoding technique making it possible to reduce the transmission and/or the storage of the motion vectors for the mesh point crowding regions.

It is yet another goal of the invention to implement an image encoding technique making it possible to ensure the constancy of the ratio between the information transmission bit rate and the image distortion rate.

BRIEF SUMMARY OF THE INVENTION

These goals, as well as others that shall appear here below, are achieved according to the invention by means of a method for the encoding of a mesh representing an image of a moving sequence, a mesh of this kind being larger in size than said image.

The term "image" is understood here to mean a 2D image, or a multidimensional image, for example an image representing a 3D object.

Thus, the invention relies on a completely novel and inventive approach to motion estimation and compensation for the encoding and decoding of image sequences, enabling the management of mesh point uncovering and mesh point crowding during the shifting of objects. Indeed, the invention proposes especially the encoding of a mesh that is larger in size than the image with which it is associated, and therefore runs counter to the preconceived ideas of those skilled in the art, who have always sought to reduce the quantity of information to be encoded and transmitted and/or stored in a data carrier. Indeed, it would seem to be quite unnecessary, in principle, for those skilled in the art to construct a mesh that is bigger than the image, since no information is available beyond the boundaries of the image.

The invention thus makes it possible, during a motion tracking operation, to maintain a mesh on the totality of each of the images of video sequence.

Advantageously, since said image has a surface area of N*M pixels, said mesh has a surface area of at least nN*nM pixels, n being an integer greater than or equal to 2.

The invention advantageously provides for the use of a mesh of infinite size. By default, the mesh stretches from one side of the image to the other, so that its surface area is at least n times greater than that of the image, where n is a sufficiently great integer, defined before the implementation of the encoding method of the invention.

According to a first advantageous characteristic of the invention, said mesh is a hierarchical mesh having at least two mesh levels nested within a mesh pyramid.

Thus, the use of a nested hierarchical mesh 41 gives a robust encoding, and reduces the cost of transmission and/or storage of information. Indeed, there is a high correlation between the information carried by a parent node and the information carried by its child nodes within the mesh. Consequently, the values of the nodes 42, 43 belonging to the highest level of the mesh pyramid (corresponding to a rough mesh of the image), are quantified with a view to their transmission, for example to an encoder, and/or their storage in a data carrier 45. However, for the lower levels of a mesh pyramid (corresponding to a finer mesh of the image), it is only the differential values of the child node 44 that are quantified, with a view to their transmission and/or their storage, as illustrated in FIG. 4.

According to a second advantageous characteristic of the invention, said mesh is a triangular mesh consisting of an arrangement of vertices and triangular faces, each defined by three references to the vertices that they connect, and having three ridges each connecting two of said vertices.

The invention can of course be applied also to any other type of polygonal mesh that has possibly undergone a preliminary triangulation.

According to an advantageous technique of the invention, an encoding method of this kind associates at least one of the following markers with at least certain of the vertices and/or certain of the faces of said mesh:

an "internal" marker,
  one face carrying an "internal" marker if it has a non-vacant intersection with said image,
  and one vertex carrying an "internal" marker if it belongs to an "internal" face;

an "entering" marker,
  one vertex carrying an "entering" marker if it carries an "internal" marker and if it is external to the image,
  and one face carrying an "entering" marker if at least one of the three vertices that it connects carries an "entering" marker.

The introduction of such markers makes it possible to differentiate between the vertices of the mesh, and therefore makes it possible, during the motion estimation, to apply a processing operation adapted to each of the vertices and/or the faces of the mesh, according to the marker associated with it.

Advantageously, an encoding method of this kind implements the following succession of steps:
  the estimation of the motion of said vertices of said mesh, between two successive images of said sequence;
  the construction of colorimetric and/or photometric information designed for vertices and/or faces of said mesh carrying said "entering" marker.

A construction step of this kind may be implemented according to the approach proposed in the patent document FR-98 12525, <<Procédé de codage d'images fixes ou animées avec réduction et adaptation du débit >>("Method for the encoding of still or moving images with reduction and adaptation of the bit rate").

An object of this technique is a method for the encoding of a digital image, aimed at producing a bit stream representing this image, the length of the bit stream being a function of the desired representation. This method comprises the following steps:
  the definition, on a domain of the image to be encoded, of a hierarchical mesh comprising a plurality of nested meshes whose mesh point vertices may be pixels of said image;
  the performance of optimizations of luminance, chrominance, and positions on each mesh level;
  the determining, for each mesh point of said hierarchical mesh, of a difference of luminance between the image to be encoded and an interpolated image obtained from the vertices of the nested mesh to which the mesh point considered belongs, and
  the introduction, into the bit stream, of the values (advantageously encoded differentially with respect of the previous hierarchical level) of positions, luminance and chrominance of the vertices of the mesh points for which the difference in luminance is greater than a threshold difference According to this technique, at the end of the mesh step, a quaternary tree structure is constructed. This tree structure is associated with the hierarchical mesh, in order to manipulate the values (colors and positions) of the vertices of the mesh points. The tree shows a number of nodes equal to the number of triangles in the corresponding mesh level. Each node of the tree relates to only one triangle of the hierarchical mesh.

Once this tree is constructed, data of the tree are selected for introduction into the bit stream representing the image which will be transmitted and/or stored. This selection depends on the quality desired.

To make the selection, for each triangle, a difference in luminance is computed between the image to be encoded and the interpolated image from vertices of the nested mesh to which the mesh point considered belongs. This difference is then compared with a threshold difference for each triangle. The value of the threshold difference is a function of the desired quality of representation.

Then, the part of the tree relating to the triangles whose difference in luminance is greater than the threshold difference is introduced into the bit stream. This makes it possible to transmit the data on the image as a function of the local quality of these different triangular partitions.

Preferably, said estimation step comprises the following sub-steps:

the optimization of the motion vectors of the vertices of said mesh that carries said "internal" marker, so as to minimize a predetermined criterion of error of reconstruction of the following image;

the interpolation and/or extrapolation of motion vectors of the vertices of said mesh that do not carry said "internal" marker, in order to fluidify the overall shift of said mesh.

Thus, during the motion estimation, only the mesh points contained at least partially in the image (namely the faces of the mesh that carry the "internal" marker) are used to determine the motion vectors. The external nodes of the mesh (namely the nodes that do not carry the "internal" marker) for their part perceive interpolated and/or extrapolated motion vectors. In this way, when the motion vectors are applied to the mesh, the crowding effects disappear and the uncovered regions are covered by external mesh points.

According to a preferred embodiment of the invention, said interpolation and/or extrapolation step implements a double forward-backward iterative scan, applied to the lowest-level vertices of said mesh pyramid for which said motion vectors of said vertices have been optimized.

Indeed, only the vertices of the mesh carrying an "internal" marker possess a significant motion vector. The mesh vertices that do not belong to the image possess, for their part, an indefinite motion vector. A problem then arises during the use of these motion vectors in order to implement an overall shift of the mesh pyramid. The fact is that to assign a zero motion vector to the vertices entails the risk of generating mesh crowding at the edge of the image, and distorts the fluidity of shift of the image, obtained by overall optimization of the motion vectors.

The invention therefore provides for the artificial propagation of the motion vectors from the vertices carrying an "internal" marker to the vertices that do not carry any "internal" marker, through the implementation of a forward-backward iterative scanning of this kind.

Advantageously, after said estimation step, an encoding method of this kind implements a step for shifting each of the vertices of said mesh, by applying its own motion vector to it.

According to an advantageous characteristic of the invention, said construction step implements, firstly, an encoding model using finite elements, and secondly an alternative encoding model, the latter being implemented, for at least certain regions of said image, as a function of a predetermined criterion of error.

Indeed, when a hierarchical encoding is implemented, for example an encoding of the kind described in the French patent application FR 98 12525, and when a portion of the image is highly textured, it is then necessary to provide for a large number of mesh levels to obtain photometric and/or colorimetric information of adequate quality. In this case, the efficiency of the hierarchical encoding is low. In other words, the hierarchical encoding is well adapted to relatively simple images, but not to images having highly textured parts.

A novel approach was therefore envisaged, as described for example in the French patent application FR 99 06815 "Procédé de codage hiérarchique et mise en œuvre sélective d'un codage à base de transformation réversible, et procédé de décodage correspondant" (Method for the hierarchical encoding and selective implementation of an encoding based on reversible transformation, and corresponding decoding method). Such a method for encoding an image to be encoded comprises the following steps:

the defining of a hierarchical mesh with at least two nested mesh levels formed by mesh points defined by the vertices (which may be pixels of said image to be encoded);

the determining, for each of said mesh points, of a piece of error information between said image to be encoded and an interpolated image obtained from vertices of the mesh points belonging to the mesh level of the mesh point considered;

the stopping of the refining of the mesh points that have a piece of error information below a first predetermined threshold;

the implementation of a specific encoding for the mesh points having a piece of error information higher than a second predetermined threshold;

the continuation of the refining of the mesh points having a piece of error information higher than said predetermined threshold and below said second predetermined threshold.

Thus, according to this method, two distinct encoding modes are used selectively. Hierarchical encoding, or encoding with nested meshes, is the main encoding, or basic encoding, but it is not used systematically: for the image portions that necessitate it, another more efficient encoding is used.

The decision to use this specific encoding is taken by comparison with a threshold. More specifically, at each node considered of the tree representing the hierarchical mesh, three possibilities are offered: stopping the refining, or the division, of the mesh points (the quality attained for the corresponding image portion being sufficient), passing to the next hierarchical level, in preserving the same hierarchical encoding, or using another encoding (especially an encoding better suited to the highly textured portions).

It will be noted that it is possible to envisage the use of several different types of specific forms of encoding (or one and the same encoding with different parameters), to adapt the choice of the encoding even more precisely to the characteristics of the image portion.

According to a preferred embodiment of the invention, said construction step implementing a hierarchical encoding model comprises the following steps:

the temporary normal projection of said vertices carrying said "entering" marker on an edge of said image;

the optimization of said colorimetric and/or photometric information on said vertices and/or said faces of said image, so as to minimize a predetermined criterion of error of reconstruction for the following image;

the repositioning of said vertices carrying said "entering" marker at their pre-projection position, said "entering" vertices carrying said optimized colorimetric and/or photometric information.

Such a temporary normal projection of the vertices carrying the "entering" marker on the edges of the image prevents pixels that do not belong to the image from being taken into account, and therefore ensures the stability of the step for optimizing the colorimetric and/or photometric information.

Preferably, said specific encoding comprises the following sub-steps:

the construction of the symmetrized image obtained by the application, to said image, of a symmetry that is axial with respect to each of its edges and a symmetry that is central with respect to each of its corners;

the optimization of said colorimetric and/or photometric information on said vertices and/or said faces of said symmetrized image by the application of said alternative model (DCT, fractals, matching pursuit).

Since the normal projection of the "entering" vertices of the mesh on the edges of the image is not adapted to the approximation of the high frequencies such as the one implemented by application of the specific encoding, it is planned to symmetrize the image. The optimization processing is then performed on the symmetrized image, and a solution is then provided to the problem of taking account of pixels that do not belong to the image.

According to an advantageous technique of the invention, an encoding method of this kind implements a step for the storage of photometric and/or colorimetric information associated with the vertices and/or faces outgoing from said image.

Thus, the information on the regions outgoing from said image may be used again if such regions are led to return to the image, without it being necessary to apply a new processing operation to them. A situation of this kind is frequent in a video sequence: this is the case, for example, with a scene located in the background of a character being followed by a video camera, if the character is moving back and forth in the image.

According to a first advantageous alternative embodiment of the invention, so long as a face of said mesh carries the "entering" marker, said construction step implements at least one iteration of the following successive sub-steps:
  the optimization of said colorimetric and/or photometric information on said vertices of said "entering" face, so as to minimize a predetermined error criterion;
  the transmission to a terminal and/or the storage on a data carrier of said optimized colorimetric and/or photometric information.

Thus the nodal photometric and/or colorimetric values of the entering mesh points are re-optimized and then transmitted and/or stored so long as they have not totally entered the image.

According to a second advantageous embodiment of the invention, so long as a face of said mesh carries the "entering" marker, said construction step implements at least one iteration of the following successive sub-steps:
  the preparation of a criterion enabling the evaluation of a quality of image reconstruction obtained by taking account of the current photometric and/or colorimetric information on the vertices of said face;
  when said quality is not satisfactory:
    the optimization of said colorimetric and/or photometric information on said vertices of said face, so as to minimize a predetermined criterion of error of reconstruction of the following image;
    the transmission to a terminal and/or the storage on a data carrier of said optimized colorimetric and/or photometric information;
  the transmission and/or storage of a tree of markers providing an indication to said terminal about whether said colorimetric and/or photometric information on the vertices of said "entering" face has been optimized or not.

The quality of the surface approximation obtained is thus estimated by taking account of the nodal photometric and/or colorimetric values available, and an optimization and a transmission and/or storage of the optimized values is carried out only in the event of major error. An alternative embodiment of this kind reduces the quantity of information to be transmitted and/or stored. The implementation of such an alternative embodiment necessitates the transmission and/or the storage of the tree of markers informing, for example the decoder, whether the photometry and/or the colorimetry of the entering mesh point has to be updated before the rendering of the image.

According to a first advantageous embodiment of the invention, said step of motion estimation furthermore comprises a sub-step for the construction of a tree of the motion vectors to be transmitted and/or to be stored, the belonging of a motion vector to said tree being determined from a criterion of relevance of the motion applied to said faces of said mesh.

Indeed, in the crowding zones, an over-representation of the motion field is obtained. It is therefore particularly advantageous to transmit only certain of the motion vectors associated with such crowding zones, so as to reduce the cost of transmission and/or storage of information.

Preferably, said criterion of relevance results from a predetermined weighted combination of the following sub-criteria:
  a surface sub-criterion, enabling an evaluation of the ratio between the surface area of one face and the mean surface area of the faces of said mesh belonging to the same level of said mesh pyramid;
  a sub-criterion of compactness, enabling an evaluation of the ratio between the surface area and the perimeter of a face of said mesh;
  a sub-criterion of antagonism of the motions, enabling an evaluation of the antagonism of the motion vectors of vertices of said mesh.

According to a second advantageous embodiment of the invention, all the motion vectors of said vertices of said mesh are transmitted and/or stored, an adapted decoder using a predetermined criterion to identify the vectors that have to be taken into account.

The cost of encoding the image is thus reduced, since it is at the time of the decoding that the relevance of the motion vectors transmitted and/or stored is evaluated.

According to a first advantageous technique of the invention, when there is a concealment of at least one vertex concealed by a face comprising at least one concealing vertex, said concealed vertex is fused with said concealing vertex.

The vertex resulting from the merger of the concealed vertex and of the concealing vertex is placed on the ridge that initially connects the concealed vertex and the concealing vertex, for example at its middle.

According to a second advantageous technique of the invention, an encoding method of this kind implements a step for the detection of at least one region of said concealed image during a shifting of said mesh, and a step for the storage of photometric and/or colorimetric information on the concealed region, with a view to possible future use, said information being not processed.

The invention also relates to a decoding method and to devices for the encoding and decoding of a mesh representing an image of a moving sequence, said mesh being larger in size than said image.

The invention also relates to a signal representing a mesh that represents an image of a moving sequence, said mesh being larger in size than said image.

Other features and advantages of the invention shall appear more clearly from the following description of a preferred embodiment, given by way of a simple and non-restrictive exemplary illustration, and from the appended drawings, of which:

FIG. 1, already described here above, illustrates the notion of the motion field;

FIG. 2, commented upon here above, describes an exemplary approximation of the motion field of FIG. 1 by interpolation or extrapolation of the inter-nodal motions;

FIG. 3, described here above, presents an exemplary mesh point reversal, resulting from the existence of antagonistic motion vectors within the motion field shown in FIG. 1;

FIG. 4, described here above, illustrates an exemplary embodiment of hierarchical transmission of information;

FIG. 5, described here above, presents an exemplary appearance of uncovering region and a crowding region of the mesh resulting from a motion within the image;

Figure 9:
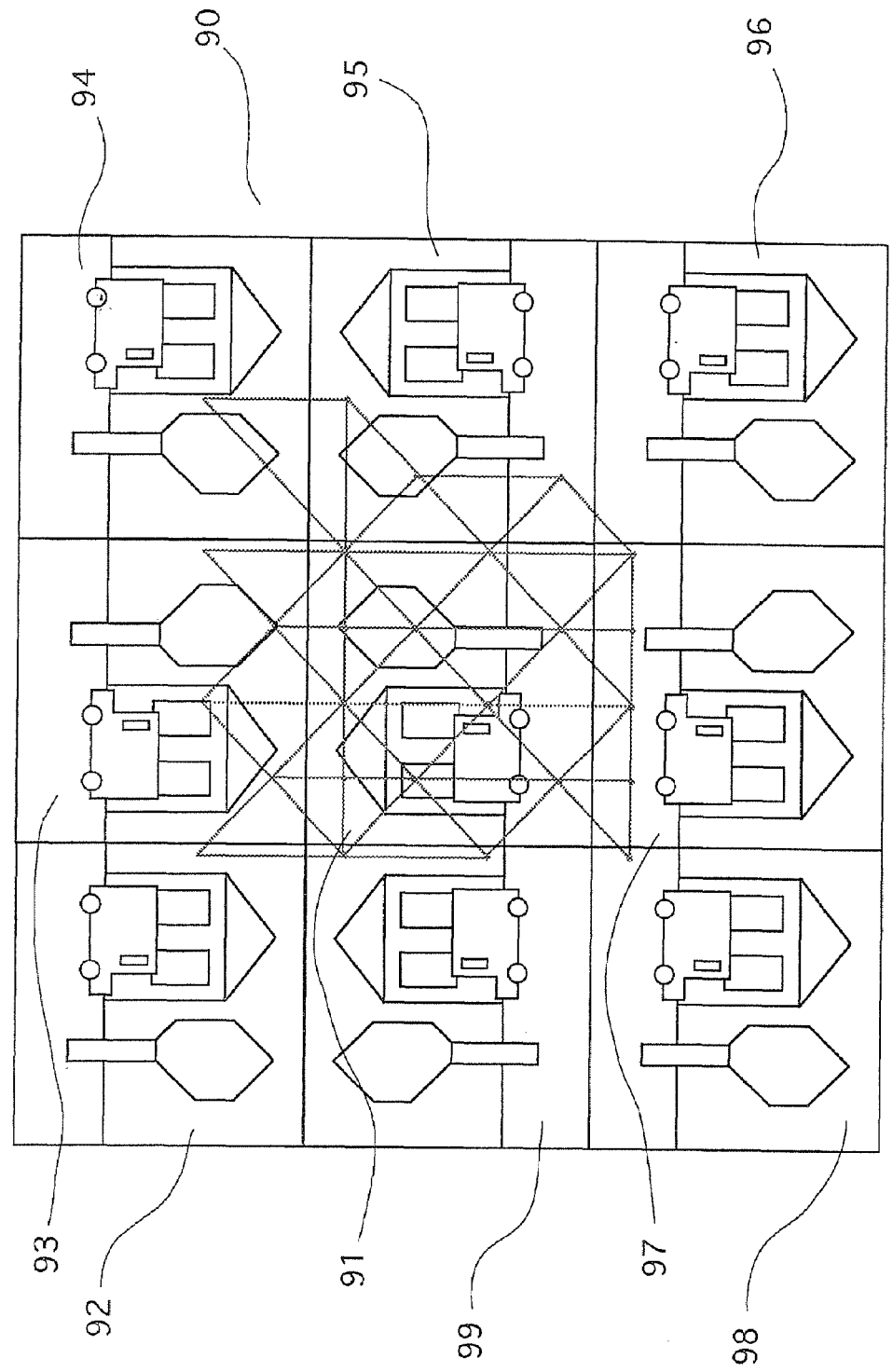
Figure 10:
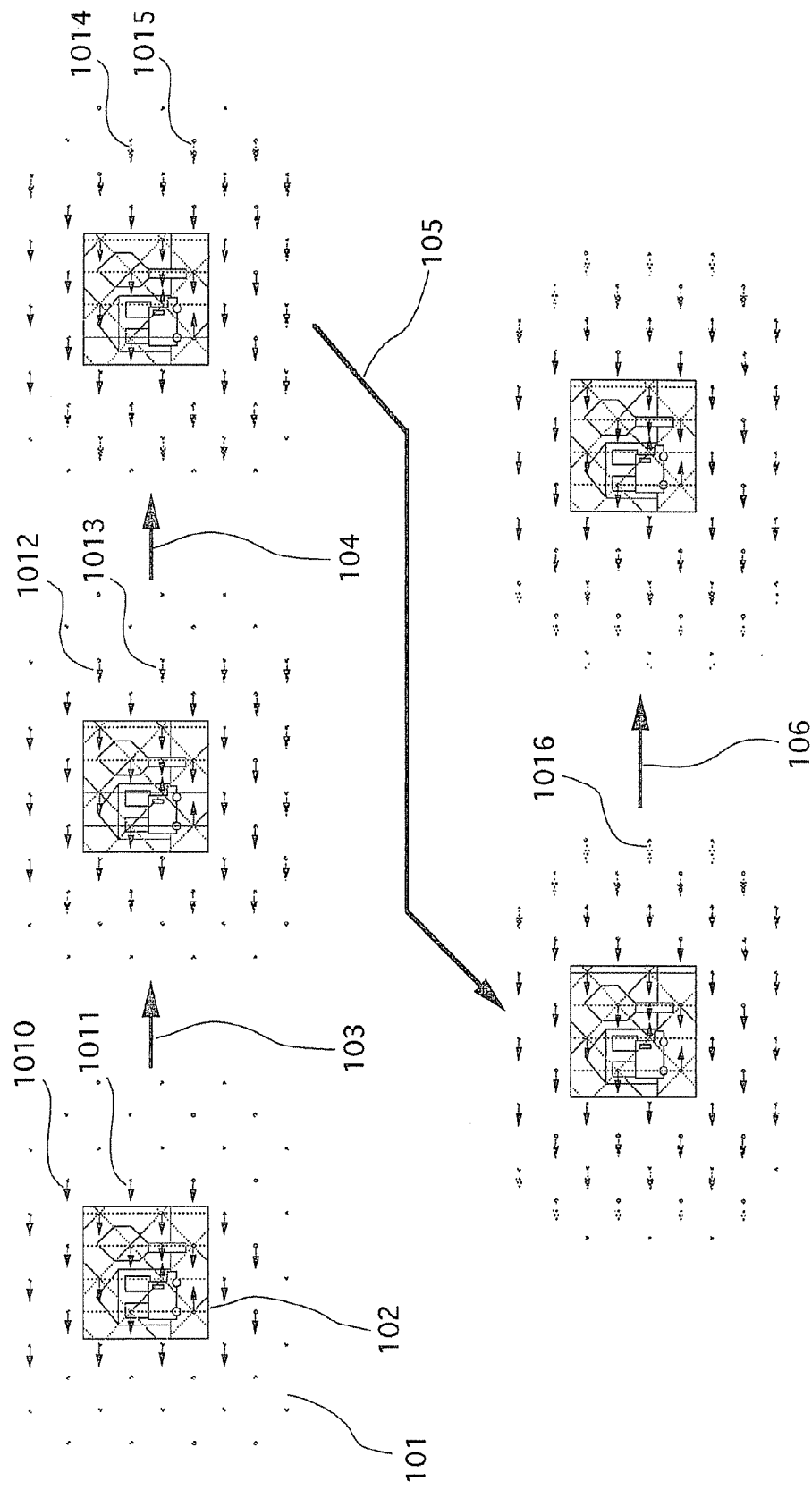
Figure 11:
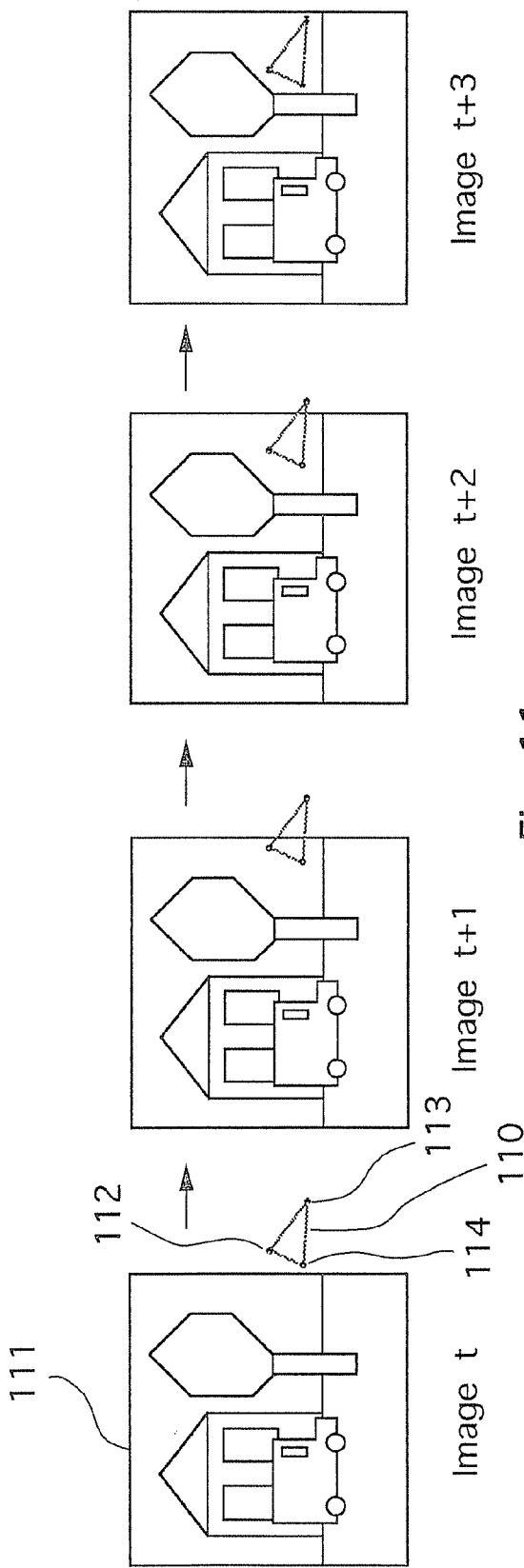
Figure 12:
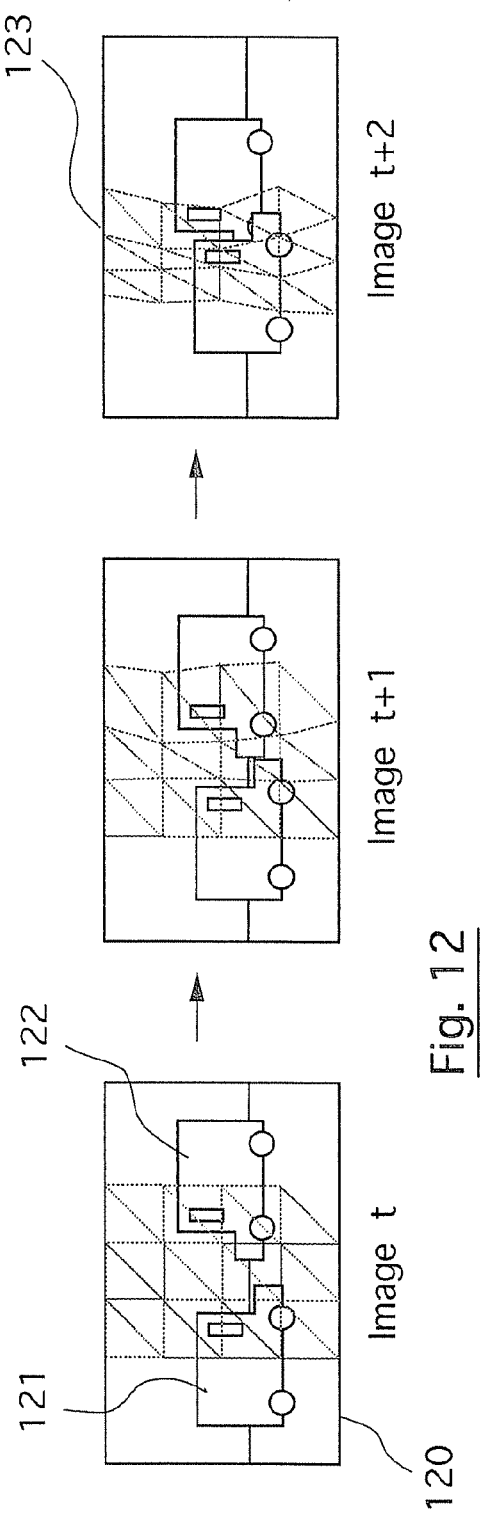
Figure 13:
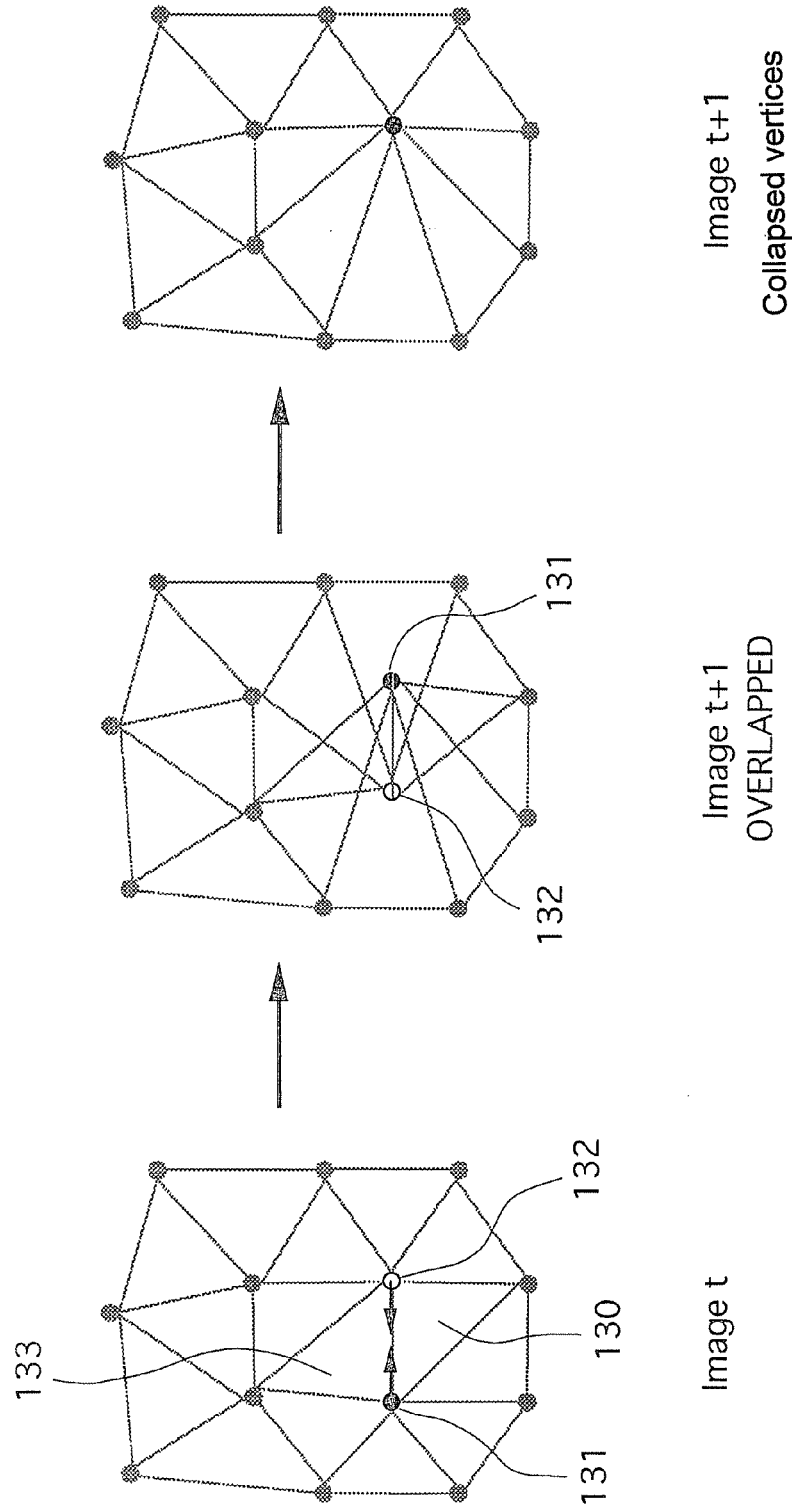
Figure 14:
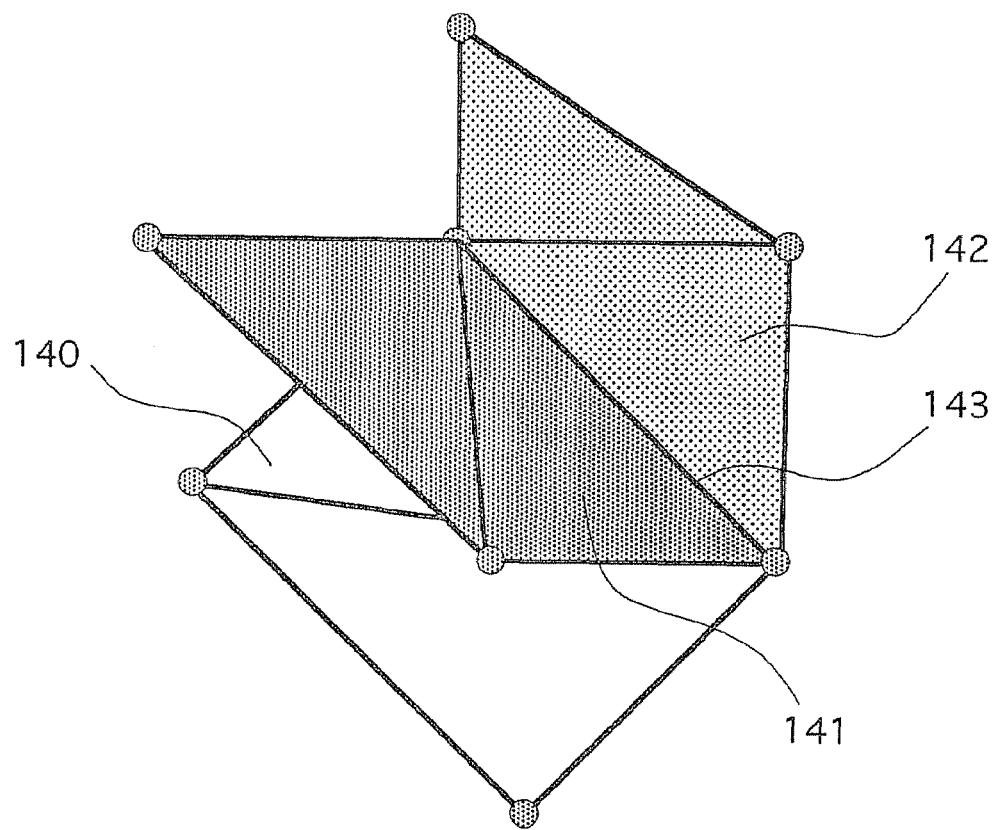

FIG. 9 exemplifies a symmetrization of the image with a view to the implementation of an alternative encoding;

FIG. 10 exemplifies a propagation of the motion vectors from the vertices carrying the "internal" marker to the other vertices of the mesh, for an overall shifting of all the vertices of the mesh pyramid;

FIG. 11 shows an example of mesh points carrying the "entering" marker during several information frames;

FIG. 12 illustrates a phenomenon of crowding of mesh points on a region of concealment of the mesh;

FIG. 13 illustrates a first example of management of the phenomena of concealment by vertex collapse;

FIG. 14 illustrates a second example of management of the phenomena of concealment by the implementation of a 3-manifold mesh.

1. The Basic Principles of the Invention

The invention therefore relates to an improvement of the technique of the motion estimation implementing a hierarchy of nested meshes (or hierarchical encoding), as described in the introduction. Indeed, the present invention provides for the use of a mesh larger in size than the images of the sequence.

Figure 1:
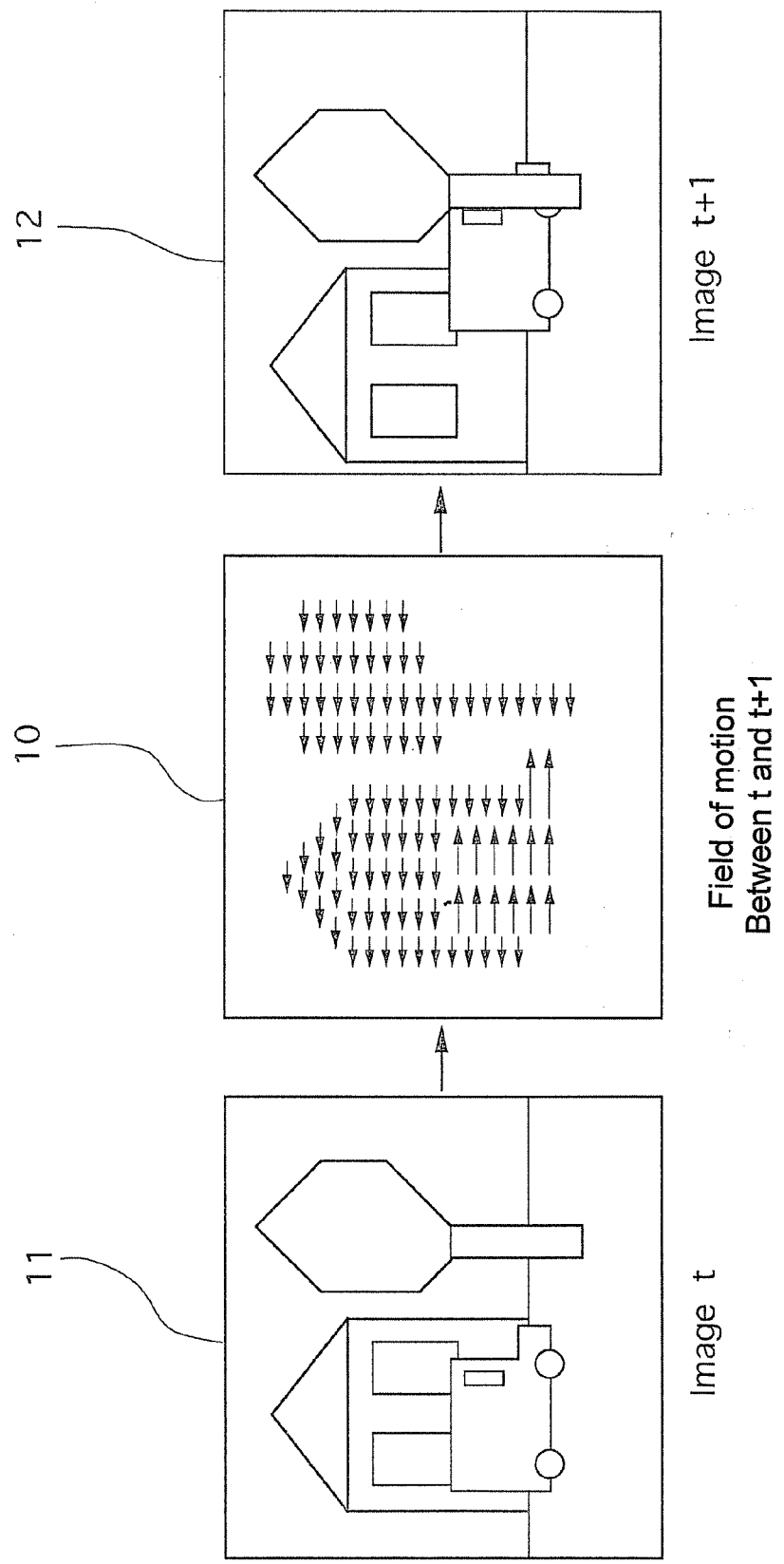
Figure 4:
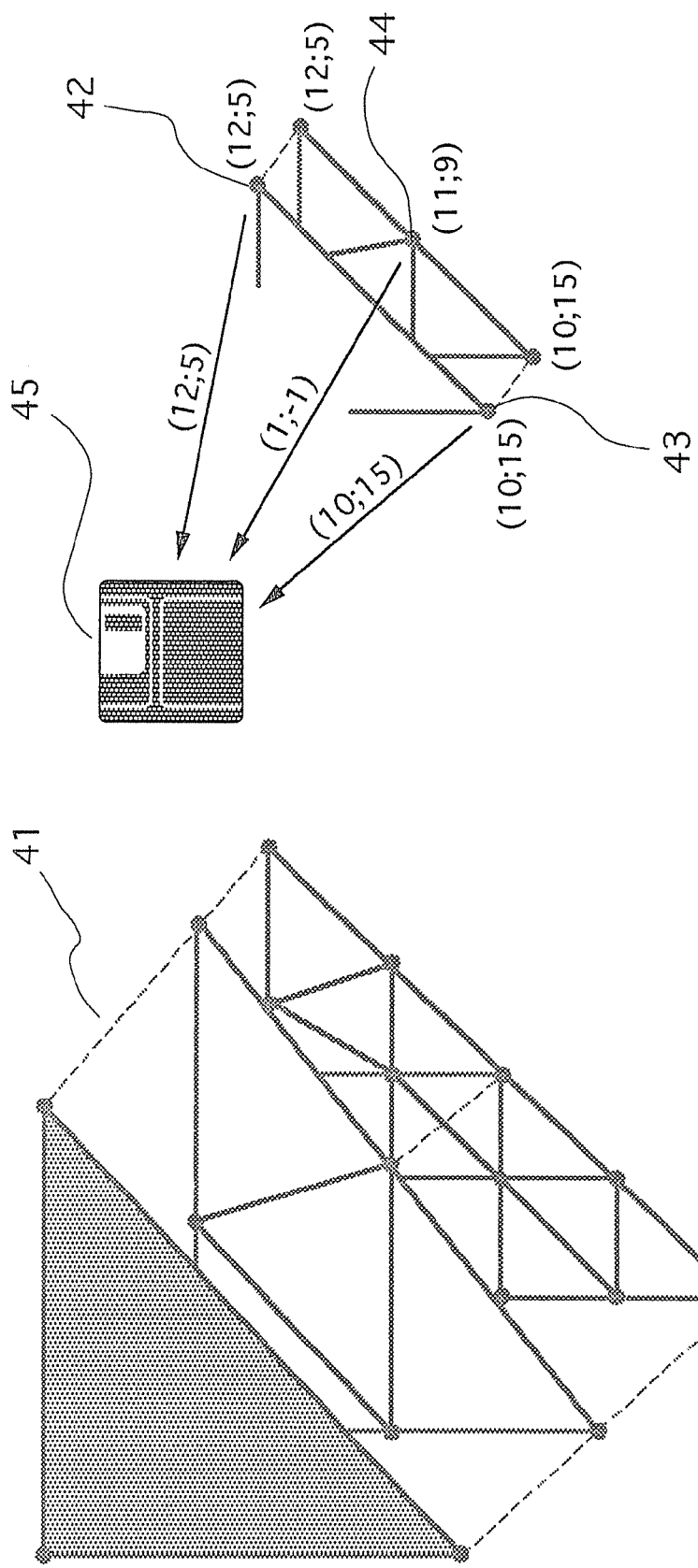
Figure 5:
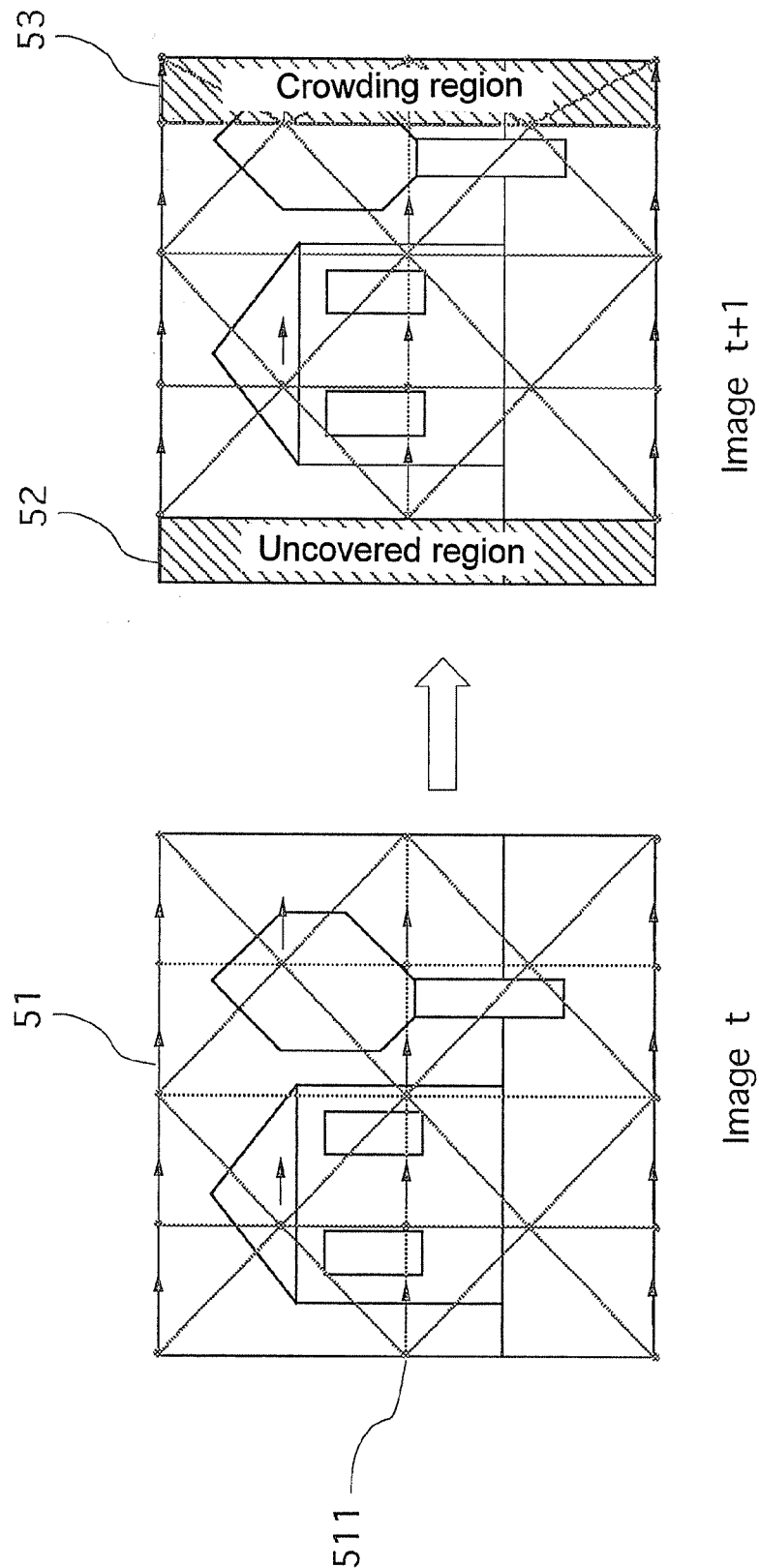
Figure 6:
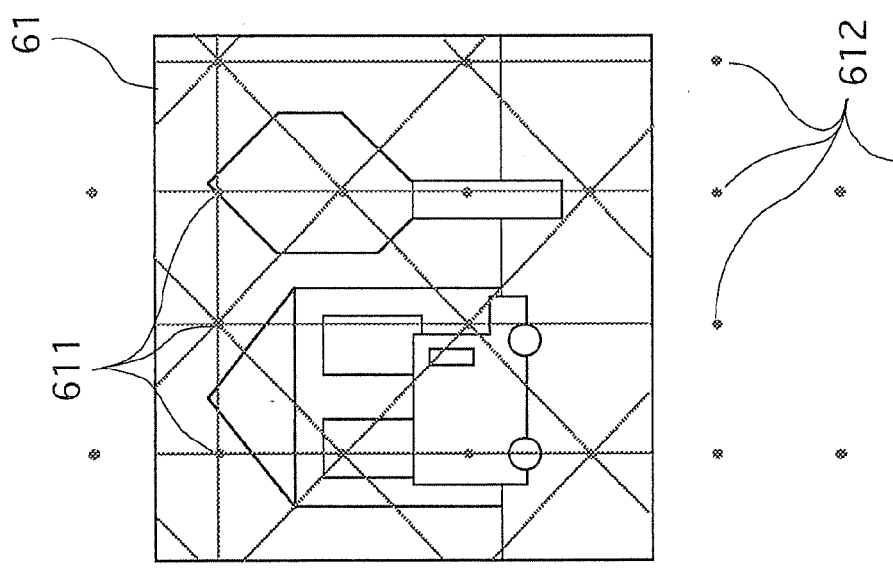
FIG. 6 illustrates the construction of a mesh larger in size than the image.

Referring to FIG. 6, an embodiment of a mesh is presented, with dimensions greater than those of the image.

An image 61 is described by means of a triangular mesh, constituted by a plurality of faces and vertices that extend beyond the boundaries of the image 61. Thus, certain vertices 611 are located within the image 61 while other vertices 612 are placed outside the boundaries of the image 61.

Ideally, a mesh of this kind is a nested hierarchical mesh with an infinite surface area.

Furthermore, the invention introduces the notion of markers, associated with the faces and/or with the vertices of the mesh, in order to reduce the bit rate for the transmission of information needed for the encoding.

Figure 7:
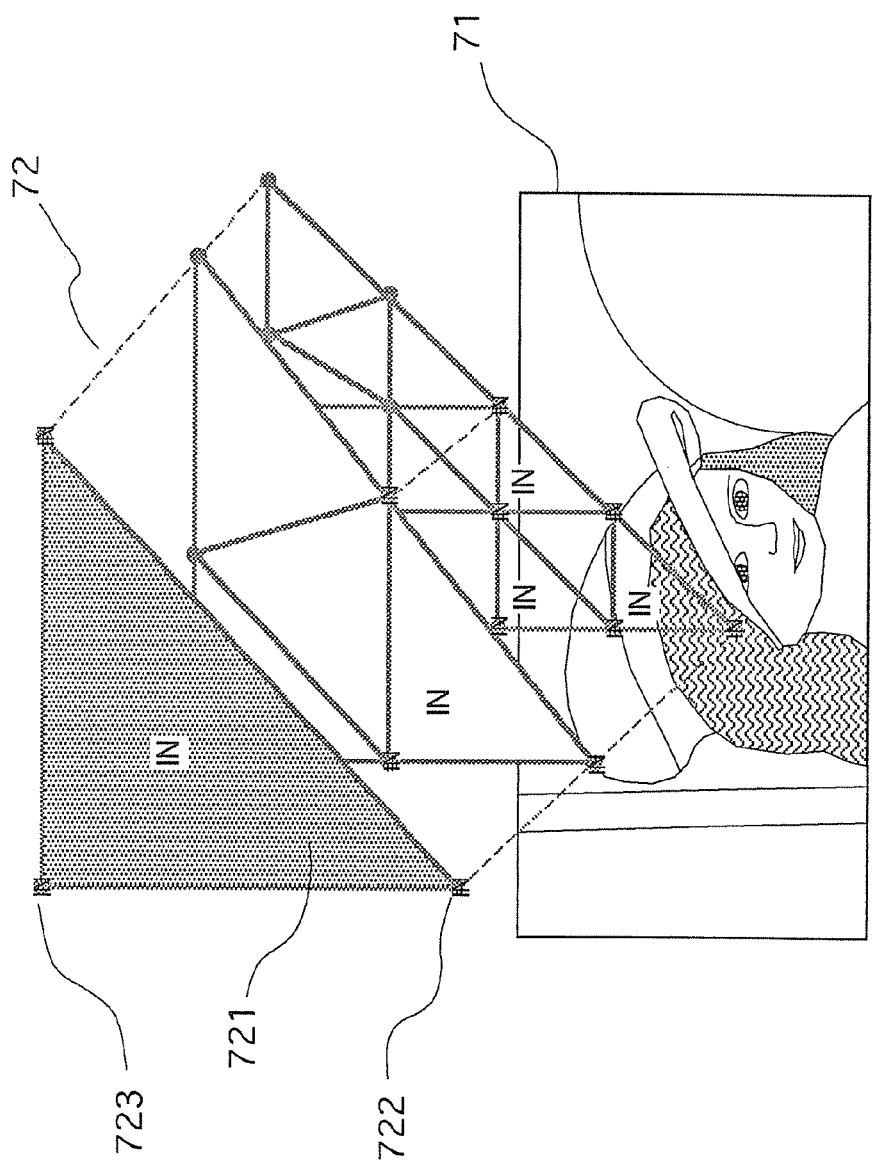
FIG. 7 shows an example of "internal" markers associated with certain faces and certain vertices of a mesh as illustrated in FIG. 6.

FIG. 7 shows an exemplary marking of the vertices and faces of a mesh by means of an "internal" marker.

The image 71 represented by a mesh 72 is considered. Each vertex and/or face of the mesh hierarchy 72 is marked or not marked by means of an "internal" marker (indicated by the two letters IN in FIG. 7) depending on whether it is located inside or outside the image 71.

More specifically, a face of the mesh is "internal" if it has an intersection with the image 71 that is non-vacant (in numbers of pixels). Thus the face referenced 721 carries the indication IN in FIG. 7.

A vertex of the mesh 72 is "internal" to a given level of the mesh 72 if it belongs to an "internal" face of the level considered. Thus the vertex referenced 722 carries the indication IN because it belongs to the "internal" face referenced 721.

It can therefore happen that a vertex is "internal" (i.e. that it carries the indication IN in FIG. 7) while in the same time being outside the image 71. For example, the vertex referenced 723 is "internal" because it belongs to the "internal" face referenced 721, but is external to the image 71.

An "entering" marker is also defined. This marker may be associated with a face and/or a vertex of the hierarchical mesh 72. A vertex is considered to be "entering" if it is "internal" and if its photometric and/or colorimetric information is undefined or unsatisfactory, that is, if it is "internal" but located outside the image 71. Furthermore, a face of the mesh 72 is considered to be "entering" if at least one of its vertices is "entering".

2. Management of the Mesh Uncovering Regions 2.1. Algorithmic Description

At each estimation of the motion of the image considered, all the vertices of the mesh that carry the "internal" marker are used to determine the optimal motion vectors of the mesh. Those motion vectors of the neighboring vertices that do not carry the "internal" marker are then interpolated or extrapolated in order to make the shifting of the mesh more fluid. It is of course possible to envisage a case where certain motion vectors are interpolated, and where other motion vectors are extrapolated.

Furthermore, an updating is performed on the photometric and/or colorimetric information associated with the faces and/or with the vertices of the mesh coming into the image for the first time (that is, the vertices carrying the "entering" marker), in order to obtain a complete approximation of the photometric and/or colorimetric surface of the image.

2.2. Photometric and/or Colorimetric Approximation of the Surface of the Image by Finite Elements A step of this kind for the construction of photometric and/or colorimetric information on the faces and/or "entering" vertices of the mesh implements an optimization per model of finite elements, according to the encoding method described in the patent application FR 99 06815 "Procédé de codage hiérarchique et mise en œuvre sélective d'un codage à base de transformation réversible et procédé de décodage correspondant" (Method for the hierarchical encoding and selective implementation of an encoding based on reversible transformation, and corresponding decoding method).

An optimization of this kind consists especially of operations to optimize luminance, chrominance and positions at each mesh level. Then, for each mesh point of the hierarchical mesh, a difference in luminance between the image to be encoded and interpolated image is determined. This difference is obtained from the vertices of the nested mesh to which the mesh point considered belongs. Finally, into a bit stream representing the image, there are introduced the values (advantageously encoded differentially with respect to the previous hierarchical level) of positions, luminance and chrominance of the vertices of the mesh points for which the difference in luminance is greater than a threshold difference.

Figure 8:
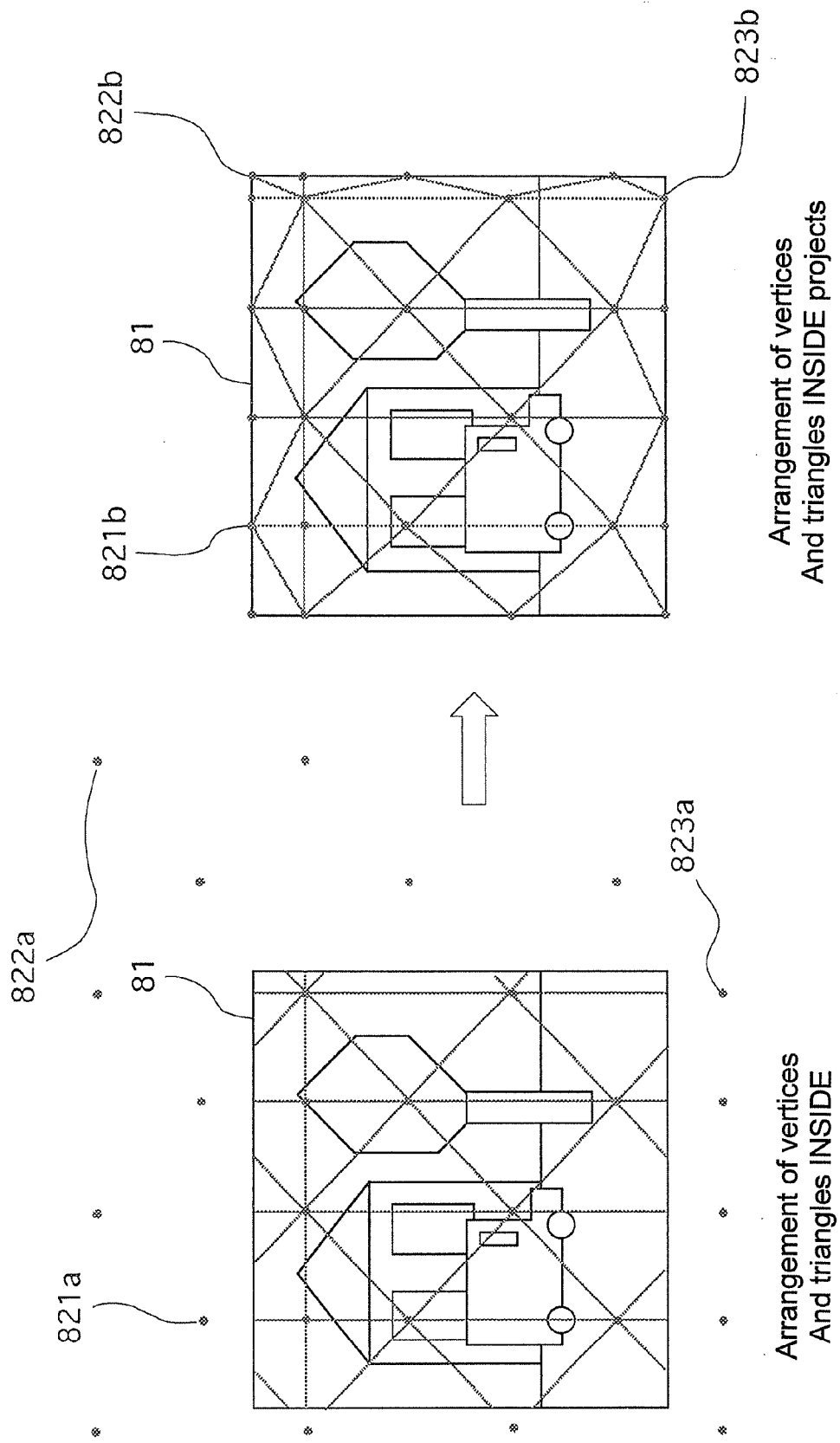
FIG. 8 illustrates the implementation of a temporary normal projection of vertices during the step for the construction of colorimetric and/or photometric information.

So as not to take account of the pixels that do not belong to the image, and therefore so as to obtain a better optimization of the colorimetric and/or photometric information, the invention carries out a temporary normal projection of the "entering" vertices on the edges of the image, as shown in FIG. 8. Thus, the vertices 821a, 822a and 823a of the mesh representing the image 81 are projected on the edges of the image at the positions 821b, 822b, 823b.

When certain faces of the mesh, after projection, no longer contain any pixels (namely when vacant faces are obtained after projection), they are not taken into account for the optimization of the colorimetric and/or photometric information. The vertices of these vacant faces are, however, taken into account during the optimization of the colorimetric and/or photometric information associated with the neighboring faces of the mesh.

After an optimization of this kind, the projected vertices 821b, 822b, 823b are put back in their initial position, 821a, 822a and 823a respectively, but the colorimetric and/or photometric information optimized after projection is associated with them.

2.3. Photometric and/or Colorimetric Approximation of the Textured Regions of the Image

2.3.1. Implementation of a Specific Encoding

Approximation by finite elements as described here above is well suited to smooth images. By contrast, when the portions of the image are highly textured, a large number of levels of hierarchical mesh need to be implemented to obtain a satisfactory surface approximation. The efficiency of the hierarchical encoding then becomes low. To overcome this drawback, it was planned, in the French patent application number FR 99 06815 "Procédé de codage hiérarchique et mise en œeuvre sélective d'un codage à base de transformation réversible et procédé de décodage correspondant" (Method for the hierarchical encoding and selective implementation of an encoding based on reversible transformation, and corresponding decoding method), to make use of an alternative model in the residual part of the textured regions.

The technique described in this patent application, and already recalled here above, relates to a method for the encoding of an image to be encoded, comprising the following steps:

the definition of the hierarchical mesh having at least two nested mesh levels formed by mesh points defined by vertices (which may be pixels of said image to be encoded);

the determining for each of said mesh points of a piece of error information between said image to be encoded and an interpolated image obtained from the vertices of the mesh points belonging to the mesh level of the mesh point considered;

the stopping of the refinement of the mesh points having a piece of error information below a first predetermined threshold;

the implementation of a specific encoding for the mesh points having a piece of error information with a value above a second predetermined threshold;

the continuing of the refining of the mesh points having a piece of error information above said predetermined threshold and below said second predetermined threshold.

Thus, according to a technique of this kind, two distinctive encoding modes are used selectively. The hierarchical encoding, or nested mesh encoding, is the main encoding or basic encoding, but it is not used systematically: for the image portions that require it, another more efficient encoding is used (DCT, fractals, matching pursuit, etc).

It is therefore chosen, according to the invention, to adopt an approach similar to the one described in the French patent application FR 99 06815, and to implement a specific encoding for the highly textured regions of the image.

2.3.2. Symmetrization of the Image

The implementation of a projection of the "entering" vertices of the mesh, prior to the optimizing of the photometric and/or colorimetric information, is not adapted to the use of a specific encoding of this kind. Indeed, an operation of this kind for the projection of the vertices highly degrades the nature of the approximation of the high frequencies of the image.

The idea therefore arose of carrying out a symmetrization of the image, as shown in FIG. 9. The images referenced 93, 95, 97 and 99 are thus obtained by the application, to the image 91, of a symmetry that is axial with respect to each of the edges of the image 91. The images referenced 92, 94, 96 and 98 for their part are images of the image 91 by a symmetry that is central with respect to each of the vertices of the image 91.

The photometric and/or colorimetric information is then optimized on the basis of the image 90, obtained by the grouping of the images referenced 91 to 99. A solution is thus provided to the problem of the pixels of the "entering" faces of the mesh, that are external to the image. A similar processing is therefore applied to all the "entering" faces of the mesh.

2.4. Motion Estimation

2.4.1. Motion Estimation for the "Internal" Vertices

The motion estimation is carried out by a technique similar to the one described in paragraph 2.2 for the surface approximation by finite elements. The motion estimation is therefore performed on the faces and vertices of the mesh carrying the "internal" marker. The "entering" vertices are temporarily projected normally on the edges of the image. An optimization is then performed on the motion vectors of the vertices of the mesh, and then the projected "entering" vertices recover their initial position before projection.

2.4.2. Propagation of the Motion

Only the vertices of the mesh carrying the "internal" marker possess a significant motion vector. It is therefore necessary to determine the value to be assigned to the motion vectors of the vertices that do not have any "internal" marker in order to be able to use them during the total shifting of the mesh pyramid. Assigning zero motion vectors to the non-internal vertices indeed gives rise to the appearance of mesh point crowding regions and alters the fluidity of the shift determined by overall optimization of the motion vectors. It was therefore thought to adopt an approach inspired by that of the computation of chamfer distance maps, as described by Edouard Thiel in "Les distances de chanfrein en analyse d'images: fondements et applications" (Chamfer distances in image analysis: foundations and applications) PhD thesis, Université Joseph Fourier, Grenoble, Sep. 21, 1994. In such an approach, the motion vectors are propagated from the "internal" vertices to the non-"internal" vertices by applying a forward-backward iterative double scan to the vertices of the lowest level of the mesh pyramid referenced $L_m$, where the motion vectors had been optimized. This approach prevents the stretching of the mesh points while enabling the insertion of the entering regions into the image, and the crowding of mesh points, in preventing the exclusion of outgoing zones.

Such a propagation of the motion is, for example, implemented in a particular embodiment, according to the following embodiment:

For all the vertices S of $L_m$
    if INTERIOR(S) then S becomes PROPAGATED
    else S becomes non-PROPAGATED
Iterate so long as there remain undefined motion vectors
    For all the vertices S of $L_m$ scanned from top left to bottom right
        If non-PROPAGATED(S) and S possesses at least 2 PROPAGATED neighbors
        Then MOTIONS(S)=mean of the MOTIONs of the PROPAGATED neighbors
        S becomes PROPAGATED
For all the vertices P of the pyramid scanned from $L_{m-1}$ to $L_0$
    MOTION (P)=MOTION (F) such that P is parent of F Referring to FIG. 10, an exemplary implementation of such an algorithm is presented. The mesh 101 representing the image 102 is considered. All the "interior" vertices of the image 102 are assigned an optimized motion vector, represented by an arrow. A scan 103 is then performed on the image, in order to propagate the motion from the top to the bottom of the image 102.

The vertices 1010 and 1011 of the mesh 101 are "internal": their respective motion vectors are therefore optimized. According to the algorithm presented here above, with the vertex referenced 1012 of the mesh 101 having the vertices referenced 1010 and 1011 as neighbors, it is assigned a motion vector, obtained by taking the average of the motion vectors of the vertices referenced 1010 and 1011.

A scan 104 is then performed on the image 102 in order to propagate the motion from the bottom to the top of the image. The vertex referenced 1014 is assigned a motion vector obtained by taking the average of the motion vectors of its neighboring vertices, referenced 1012 and 1013, whose motion vectors had been determined during the first scan 103.

A further scan referenced 105 is then applied in order to propagate the motion from the top to the bottom of the image 102. The motion is propagated for example to the vertex referenced 1016 of the mesh, to which there is assigned a motion vector averaged from the motion vectors of the vertices referenced 1014 and 1015.

A scan referenced 106 is then carried out from the bottom to the top of the image 102. At the end of a scan of this kind, it is noted that all the vertices of the mesh 101 possess a motion vector, represented by an arrow in FIG. 10. The motion is therefore propagated to the entire mesh 101. The parent nodes of the nodes of the mesh 101, in the upper levels of the mesh pyramid, are then associated with motion vectors having values equal to those of their child nodes.

2.4.3. Overall Shift of the Mesh Pyramid

Each vertex of the mesh pyramid is then subjected to an overall shift through the application, to it, of the motion vector that was associated with it during the previous step of propagation of motion. A shift of this kind has the effect of:
- making the mesh units enter when an object enters the image;
- making the mesh units come out, following an object that comes out of the image;
- limiting the degeneration of the mesh.

2.5. Photometric and/or Colorimetric Approximation of the Faces Carrying the "Entering" Marker on Several Successive Frames It can be seen, in video encoding, that a face of the mesh, which follows for example the entry of an object into the image, can carry the "entering" marker on several successive data frames, as illustrated in FIG. 11.

Now the "entering" vertices of the mesh do not possess any photometric and/or colorimetric information, the latter being approximated from available photometric and/or colorimetric information, associated with the portions of the "entering" faces located inside the image.

The invention proposes two alternative embodiments for the management of photometric and/or colorimetric information on faces carrying the "entering" marker on several successive frames.

In a first embodiment, an optimization of this information is performed at each data frame. Thus the nodal photometric and/or colorimetric values of the entering faces 110 are re-optimized and transmitted and/or stored in a data carrier at each approximation of the photometric and/or colorimetric surface of the image (namely at each instant t, t+1, t+2 and t+3), and this is done so long as the entering face 110 considered is not entirely included in the image 111.

In a second alternative embodiment, less costly in terms of data transmission, a quality criterion is set up, and this criterion is compared with the quality of the photometric and/or colorimetric approximation of the surface area of the image, obtained in taking account of the current nodal photometric values of the entering faces. If a comparison of this kind reveals a major error in the approximation of the image, then there is an optimization and a transmission and/or storage, on a data carrier, of the photometric and/or colorimetric information on the "entering" vertices. If, on the contrary, the quality of the approximation of the image is satisfactory, the current photometric and/or colorimetric values for the "entering" vertices are preserved.

According to this second alternative embodiment, a tree of specific markers is also constructed. This tree is associated with the "entering" vertices 112 to 114, and makes it possible to inform a decoder or any other appropriate terminal if the photometry and/or the colorimetry of the "entering" 'face 110 considered has to be updated before the rendering of the image 111.

2.6. Storage of the Photometric and/or Colorimetric Information Associated with the Regions Coming Out of the Image At the end of the above steps of motion estimation and approximation of the photometric and/or colorimetric surface area of the image, the photometric and/or colorimetric information associated with the outgoing regions of the image is stored, in such a way that such information is directly available, without it being necessary to implement a new, lengthy and costly processing operation, should such outgoing regions again enter the image.

Indeed, it is frequent in video sequences for certain objects to enter and come out of the image several times (for example in the case of a scene located in the background of a character going to and fro in the image), and it is therefore particularly astute to store information on this object so as not to have to implement a new processing operation each time the object enter the image.

3. Management of the Mesh Crowding Regions 3.1. Principle of the Adaptive Optimization of Motion According to the principle of hierarchical encoding by finite elements described here above, the motion vectors of the vertices belonging to the levels $L_0$ to $L_m$ of the mesh pyramid are all optimized.

Now, when two objects 121, 122 intersect within the image 120 for example, mesh point crowding regions 123 appear at the boundary between the two objects, as illustrated in FIG. 12. In crowding regions 123 of this kind, an over-representation is obtained. This over-representation is unnecessary and costly in terms of the transmission of data on the motion field.

To compensate for this phenomenon, it is planned, according to the invention, to introduce a criterion of relevance of motion, enabling the selection of the most relevant motion vectors, and enabling the most efficient possible estimation of the shift within the crowding region.

A "relevant" marker is therefore defined. This marker is borne by the vertices of the mesh whose motion vectors have to be transmitted and/or stored on a data carrier. A tree is then constructed. This tree bring together all the motion vectors to be transmitted and/or to be stored thus making it possible, in the crowding regions, to obtain the transmission of motion on a locally reduced number of levels of the mesh pyramid.

According to another alternative embodiment of the invention, with a reduced encoding cost, all the motion vectors associated with the vertices of the crowding region considered are transmitted and/or stored in a data carrier. The relevance of the motion vectors with respect to the estimation of total motion of the image is then evaluated when the image is decoded.

3.2. Construction of a Tree of Relevance of the Motion

The "relevant" marker may take a value TRUE when the motion of a vertex is relevant for the estimation of the total motion of the image and, on this basis, must be transmitted and/or stored in a data carrier, or if not it may take a value FALSE.

The relevance tree is constructed from the faces and vertices of the hierarchical mesh belonging to a level of the mesh pyramid that is lower than or equal to $L_m$.

A criterion of relevance, referenced CP(T), is defined as being [0;1]-valued, and a threshold of relevance SP, also [0;1]-valued. It can of course be envisaged that the criterion of relevance and the threshold of elements can be valued in any other interval [A;B] adapted to the invention.

For a given triangle T of the triangular mesh considered, the value of the "relevant" marker is defined as follows:

RELEVANT (T)=CP(T)>SP

Furthermore the criterion CP is defined by weighted combination of three sub-criteria that are [0;1]-valued:

a surface area sub-criterion CS enabling the evaluation of the ratio between the surface area of the triangle T considered and the mean surface area of the triangles of the same level of the mesh:

$CS(T)$=surf($T$)/average{surf($T'$)such that $T'$ belongs to the same mesh level as $T$};

a sub-criterion CC of compactness, possibly standardized, enabling the evaluation of the ratio between the surface area and the perimeter of the triangle T considered:

$CC(T)$=(1/$CC$(Equilateral)*surf($T$)/[4*$\pi$*perimeter($T$)$^2$].

A criterion of this kind is the maximum and is equal to 1 if T is equilateral, and it is zero if T is flat;

a sub-criterion CA of antagonism of the motions of the vertices of the kind considered. A criterion of this kind is equal to 1 if the motions of the vertices of T are antagonistic, i.e. in the presence of a potential mesh reversal, and 0 if they have the same direction and sense. If D1, D2 and D3 are the motion vectors of the vertices of T, then:

$CA(T)$=1 if sign(<$D1,D2$>)<0 or sign(<$D3,D2$>)<0 or sign(<$D1,D3$>)<0

$CA(T)$=0 else.

Thus, CP(T)=[a*CS(T)+b*CC(T)+c*CA(T)]/[a+b+c]
where a, b, and c are predetermined scalar values.

A detailed description is given here below of an exemplary algorithm that can be implemented to assign the "relevant" marker to the vertices in triangles of the mesh, and therefore determine the motion vectors to be transmitted and/or stored in a data carrier:

For all the vertices S of the mesh pyramid scanned from the levels $L_0$ to $L_m$
  The "relevant" marker of S is initialized at FALSE
For all the triangles T of the mesh pyramid scanned from the levels $L_0$ to $L_m$
  If CP(T)>$SP_m$
  Then, the "relevant" marker of T takes the value TRUE
    the "relevant" marker of the vertices of T takes the value TRUE
  Else the "relevant" marker of T takes the value FALSE
For all the vertices S of the mesh pyramid scanned from the levels $L_0$ to $L_m$
  If "relevant" (S) then transmit the motion from S.

3.3. Management of the Concealment of Mesh Links

When, for example, two objects intersect within the image, phenomena of concealment may occur. This may be managed by two distinct methods according to the invention.

3.3.1. Vertex Collapse

The first method implemented according to the invention consists of the detection, at the time of the decoding, of the concealment regions determined by the faces 130, 133 of the mesh whose vertices 131, 132 are antagonistic motion vectors, according to the sub-criterion CA, as shown in FIG. 13. Indeed, the faces 130, 133 thus detected are capable of reversing because their vertices 131, 132 are positioned on different objects, one of the two objects concealing its neighbor.

According to the particular embodiment described herein, an edge collapse is then made between the two neighboring vertices 131, 132 having an antagonistic motion. This results in the disappearance of a triangle 130, 133, reflecting the disappearance of a part of an object. The vertex obtained by fusing the vertices 131 and 132 is placed on the edge initially connecting the vertices 131 and 132, for example at its middle, or at the position of one of the two vertices 131 and 132, as shown in FIG. 13, where the collapsed vertex is located at the position initially occupied by the vertex 132.

3.3.2. N-manifold

A second method implemented according to the invention to manage the phenomena of mesh unit concealment consists in working on an n-manifold mesh, as illustrated in FIG. 14. An n-manifold mesh is defined as a triangular mesh in which a ridge may be shared by n triangles, where n≧2.

Thus, FIG. 14 shows an exemplary 3-manifold mesh, in which the ridge referenced 143 is common with the three triangles referenced 140, 141, and 142.

According to such a method, first of all an estimation of the motion of the image is made, without taking account of the "relevant" marker described here above. When the image is decoded, when the concealment region (i.e. a reversal of the kind of the mesh considered) is detected, the triangles associated with this region then become the carriers of an "overlapped" marker. Then a new optimization is made of the motion of the image, excluding the triangles of the mesh carrying the "overlapped" marker.

This new optimization may lead to the appearance of further mesh reversals which, in turn, become carriers of an "overlapped" marker. Then another optimization of the motion is made.

Thus the regions of the mesh carrying the "overlapped" marker mark the uncovering or the overlappings of the mesh units: they therefore correspond to concealed objects.

The method implemented in the particular embodiment described in this paragraph consists in temporarily moving away the triangles carrying the marker "overlapped", while at the same time keeping them in memory, so as to be able to manage their possible reappearance in the image.

Depending on the topology of a mesh region carrying the "overlapped" marker (also called an "overlapped" sub-mesh), the following two cases are distinguished:

the boundaries of the "overlapped" sub-mesh are annulled, and the mesh then becomes n-manifold (3-manifold in the example of FIG. 14);

only a part of the boundaries of the sub-mesh is annulled, and the local correction is made in the contents of the other "overlapped" meshes.

The use of an n-manifold mesh advantageously enables the preservation of the photometric and/or colorimetric information associated with the regions of the mesh that may disappear or appear at various times during the video sequence considered.

3.3. CONCLUSION

The introduction of a criterion of relevance of the motion makes it possible to reduce the cost of the transmission and/or of the storage of the motion vectors of the crowding regions while at the same time preserving the appearance of the mesh unit reversals needed to update the contents of the mesh. Thus, the estimation of the motion and the transmission and/or the storage of the motion vectors are governed by a relevance tree. This provides for the almost total constancy of the ratio between the transmission bit rate and the image distortion, despite the entry of new mesh units into the image, and the crowding of certain other mesh units.

The invention claimed is:

1. Method comprising encoding of a mesh representing an image of a moving sequence, wherein said mesh is larger in size than said image, and associating at least one of the following markers with at least certain of the vertices and/or certain of the faces of said mesh:
   an "internal" marker,
      one face carrying an "internal" marker if it has a non-vacant intersection with said image,
      and one vertex carrying an "internal" marker if it belongs to an "internal" face;
   an "entering" marker,
      one vertex carrying an "entering" marker if it carries an "internal" marker and if it is external to the image,
      and one face carrying an "entering" marker if at least one of the three vertices that it connects carries an "entering" marker.

2. Encoding method according to claim 1 characterized in that, said image having a surface area of N*M pixels, said mesh has a surface area of at least nN*nM pixels, n being an integer greater than or equal to 2.

3. Encoding method according to claim 1, characterized in that said mesh is a hierarchical mesh having at least two mesh levels nested within a mesh pyramid.

4. Encoding method according to claim 1, characterized in that said mesh is a triangular mesh consisting of an arrangement of vertices and triangular faces, each defined by three references to the vertices that they connect, and having three ridges each connecting two of said vertices.

5. Encoding method according to claim 1, characterized in that it implements the following succession of steps:
   estimation of the motion of said vertices of said mesh, between two successive images of said sequence;
   construction of colorimetric and/or photometric information designed for vertices and/or faces of said mesh carrying said "entering" marker.

6. Encoding method according to claim 5, characterized in that said estimation step comprises the following sub-steps:
   the optimization of the motion vectors of the vertices of said mesh that carries said "internal" marker, so as to minimize a predetermined criterion of error of reconstruction of the following image;
   the interpolation and/or extrapolation of motion vectors of the vertices of said mesh that do not carry said "internal" marker, in order to fluidify the overall shift of said mesh.

7. Encoding method according to claim 6, characterized in that said interpolation and/or extrapolation step implements a double forward-backward iterative scan, applied to the lowest-level vertices of said mesh pyramid for which said motion vectors of said vertices have been optimized.

8. Encoding method according to claim 6, characterized in that after said estimation step, it implements a step for shifting each of the vertices of said mesh, by applying its own motion vector to it.

9. Encoding method according to claim 6, characterized in that said construction step implements, firstly, an encoding model using finite elements, and secondly an alternative encoding model, the latter being implemented for at least certain regions of said image, as a function of a predetermined error criterion.

10. Encoding method according to claim 6, characterized in that, said construction step implementing a hierarchical encoding model, it comprises the following steps:
    the temporary normal projection of said vertices carrying said "entering" marker on an edge of said image;
    the optimization of said colorimetric and/or photometric information on said vertices and/or said faces of said image, so as to minimize a predetermined criterion of error of reconstruction for the following image;
    the repositioning of said vertices carrying said "entering" marker at their pre-projection position, said "entering" vertices being carriers of said optimized colorimetric and/or photometric information.

11. Encoding method according to claim 9, characterized in that said specific encoding comprises the following sub-steps:
    the construction of the symmetrized image obtained by the application, to said image, of a symmetry that is axial with respect to each of its edges and a symmetry that is central with respect to each of its corners;
    the optimization of said colorimetric and/or photometric information on said vertices and/or said faces of said symmetrized image by the application of said alternative model (DCT, fractals, matching pursuit).

12. Encoding method according to claim 1, characterized in that it implements a step for the storage of photometric and/or colorimetric information associated with the vertices and/or faces outgoing from said image.

13. Encoding method according to claim 5, characterized in that, so long as a face of said mesh carries the "entering" marker, said construction step implements at least one iteration of the following successive sub-steps:
    the optimization of said colorimetric and/or photometric information on said vertices of said "entering" face, so as to minimize a predetermined error criterion;
    the transmission to a terminal and/or the storage on a data carrier of said optimized colorimetric and/or photometric information.

14. Encoding method according to claim 5, characterized in that, so long as a face of said mesh carries the "entering" marker, said construction step implements at least one iteration of the following successive sub-steps:
    the preparation of a criterion enabling the evaluation of a quality of image reconstruction obtained by taking account of the current photometric and/or colorimetric information on the vertices of said face;
    when said quality is not satisfactory:
       the optimization of said colorimetric and/or photometric information on said vertices of said face, so as to minimize a predetermined criterion of error of reconstruction of the following image;
       the transmission to a terminal and/or the storage on a data carrier of said optimized colorimetric and/or photometric information;
    the transmission and/or storage of a tree of markers providing an indication to said terminal about whether said colorimetric and/or photometric information on the vertices of said "entering" face has been optimized or not.

15. Encoding method according to claim 5, characterized in that said step of motion estimation furthermore comprises a sub-step for the construction of a tree of the motion vectors to be transmitted and/or to be stored, the belonging of a motion vector to said tree being determined from a criterion of relevance of the motion applied to said faces of said mesh.

16. Encoding method according to claim 15, characterized in that said criterion of relevance results from a predetermined weighted combination of the following sub-criteria:
   a surface sub-criterion, enabling an evaluation of the ratio between the surface area of one face and the mean surface area of the faces of said mesh belonging to the same level of said mesh pyramid;
   a sub-criterion of compactness, enabling an evaluation of the ratio between the surface area and the perimeter of a face of said mesh;
   a sub-criterion of antagonism of the motions, enabling an evaluation of the antagonism of the motion vectors of vertices of said mesh.

17. Encoding method according to claim 5, characterized in that all the motion vectors of said vertices of said mesh are transmitted and/or stored, an adapted decoder using a predetermined criterion to identify the vectors that have to be taken into account.

18. Encoding method according to claim 1, characterized in that when there is a concealment of at least one vertex concealed by a face comprising at least one concealing vertex, said concealed vertex is fused with said concealing vertex.

19. Encoding method according to claim 1, characterized in that it implements a step for the detection of at least one region of said concealed image during a shifting of said mesh, and a step for the storage of photometric and/or colorimetric information on the concealed region, with a view to possible future use, said information being not processed.

20. Device for encoding a mesh representing an image of a moving sequence wherein said mesh is larger in size than said image, wherein the device comprises an encoder, which associates at least one of the following markers with at least certain of the vertices and/or certain of the faces of said mesh:
   an "internal" marker,
      one face carrying an "internal" marker if it has a non-vacant intersection with said image,
      and one vertex carrying an "internal" marker if it belongs to an "internal" face; and
   an "entering" marker,
      one vertex carrying an "entering" marker if it carries an "internal" marker and if it is external to the image,
      and one face carrying an "entering" marker if at least one of the three vertices that it connects carries an "entering" marker.

21. Method for decoding a mesh representing an image of a moving sequence, wherein said mesh is larger in size than said image, comprising: associating at least one of the following markers with at least certain of the vertices and/or certain of the faces of said mesh:
   an "internal" marker,
      one face carrying an "internal" marker if it has a non-vacant intersection with said image,
      and one vertex carrying an "internal" marker if it belongs to an "internal" face; and
   an "entering" marker,
      one vertex carrying an "entering" marker if it carries an "internal" marker and if it is external to the image,
      and one face carrying an "entering" marker if at least one of the three vertices that it connects carries an "entering" marker; decoding the mesh.

22. Device for decoding a mesh representing an image of a moving sequence, wherein said mesh is larger in size than said image, and wherein the device comprises a decoder, which associates at least one of the following markers with at least certain of the vertices and/or certain of the faces of said mesh:
   an "internal" marker,
      one face carrying an "internal" marker if it has a non-vacant intersection with said image,
      and one vertex carrying an "internal" marker if it belongs to an "internal" face; and
   an "entering" marker,
      one vertex carrying an "entering" marker if it carries an "internal" marker and if it is external to the image,
      and one face carrying an "entering" marker if at least one of the three vertices that it connects carries an "entering" marker; and decodes the mesh.

* * * * *

UNITED STATES PATENT AND TRADEMARK OFFICE
CERTIFICATE OF CORRECTION

| | | |
|---|---|---|
| PATENT NO. | : 7,502,413 B2 | Page 1 of 1 |
| APPLICATION NO. | : 10/332684 | |
| DATED | : March 10, 2009 | |
| INVENTOR(S) | : Guillaume Robert and Nathalie Laurent-Chatenet | |

It is certified that error appears in the above-identified patent and that said Letters Patent is hereby corrected as shown below:

Column 1:

delete lines 7 to 9

"This application is the US national phase of international application, 371 of PCT/FR01/02131, filed 3 Jul. 2001 which claim benefit of FR00/09273, filed 13 Jul. 2000."

and insert

-- This Application is a Section 371 National Stage Application of International Application No. PCT/FR01/02131 filed 3 July 2001 and published as WO 02/07099 on 24 January 2002, not in English. --

Column 10:

Between lines 52 and 53 insert the heading -- BRIEF DESCRIPTION OF THE DRAWINGS --

Column 11:

Between lines 26 and 27 insert the heading -- DETAILED DESCRIPTION OF PREFERRED EMBODIMENTS --

Signed and Sealed this
Eighth Day of March, 2011

David J. Kappos
*Director of the United States Patent and Trademark Office*